United States Patent [19]

Broz

[11] 3,904,656

[45] Sept. 9, 1975

[54] PROCESS FOR PREPARING MONOETHYLENE GLYCOL AND ETHYLENE OXIDE

[75] Inventor: Stephen E. Broz, Beaumont, Tex.

[73] Assignee: PPG Industries, Inc., Pittsburgh, Pa.

[22] Filed: Feb. 13, 1973

[21] Appl. No.: 332,056

[52] U.S. Cl. .... 260/348.5 R; 260/635 E; 260/637 R
[51] Int. Cl.² ................. C07C 31/20; C07D 301/32
[58] Field of Search ...... 260/635 E, 348.5 R, 637 R

[56]  References Cited
UNITED STATES PATENTS

| | | | |
|---|---|---|---|
| 2,125,333 | 8/1938 | Carter | 260/348.5 R |
| 2,409,441 | 10/1946 | Metzger | 260/637 R |
| 2,430,443 | 11/1947 | Pecker | 260/348.5 R |
| 2,756,241 | 7/1956 | Courter | 260/635 E |
| 3,367,847 | 2/1968 | Pierson | 260/637 R |
| 3,418,338 | 12/1968 | Gilman et al. | 260/348.5 R |
| 3,597,452 | 8/1971 | Laemmle et al. | 260/348.5 |
| 3,732,320 | 5/1973 | Ford | 260/637 R |

Primary Examiner—Joseph E. Evans
Attorney, Agent, or Firm—Irwin M. Stein

[57]  ABSTRACT

An improved process for preparing fiber grade monoethylene glycol is provided which obviates the need for sewering large amounts of water.

3 Claims, 1 Drawing Figure

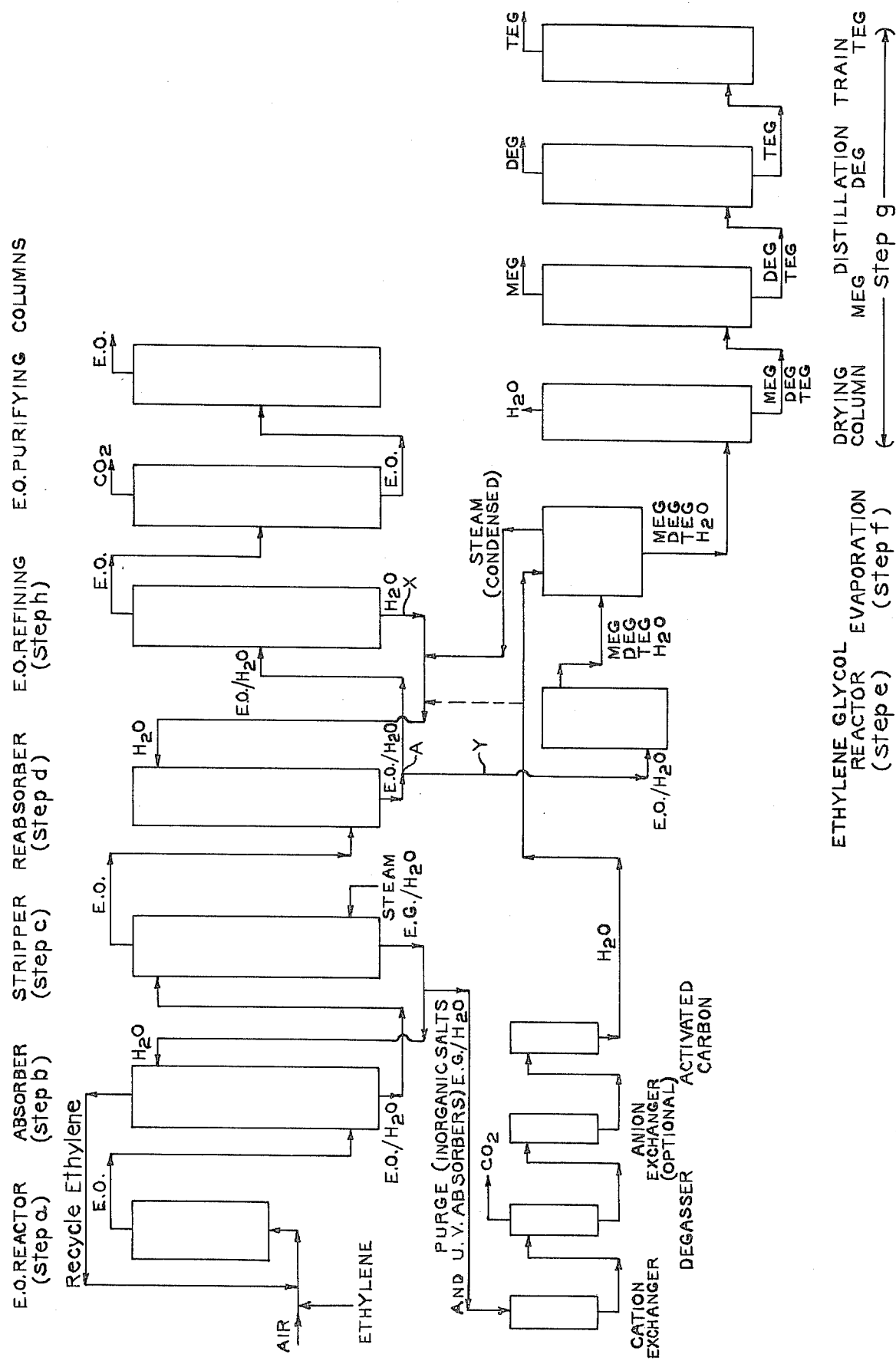

PROCESS FOR PREPARING MONOETHYLENE GLYCOL AND ETHYLENE OXIDE

DESCRIPTION OF THE INVENTION

Ethylene glycols (monoethylene glycol, diethylene glycol and triethylene glycol) are prepared commercially by several methods. One of these methods involves a two-stage reaction system, the first stage of which requires the direct oxidation of ethylene with air or elemental oxygen over a suitable catalyst, typically a silver-containing catalyst, at elevated temperature (100°C. to 500°C. is typical) and at superatmospheric pressure (2 to 25 atmospheres).

Ethylene oxide produced in these reactors, which may be fixed or fluid bed reactors, as typified by U.S. Pat. No. 2,125,333 and U.S. Pat. No. 2,430,443, is removed from the reactors in a gas stream and is passed into an ethylene oxide absorber where the gas stream is contacted with water to absorb the ethylene oxide content thereof. The gases (which still contain appreciable quantities of ethylene) are then recycled to the ethylene oxide reactor while the ethylene oxide containing water in the absorber is passed to a stripper, e.g., stripping column. In the stripper, steam or hot water is introduced and contacted usually countercurrent to the ethylene oxide fed thereto to remove ethylene oxide product overhead. The water discharged from the stripper is recirculated to the absorber for use in absorbing ethylene oxide therein.

In other systems a steam heated reboiler is employed to heat water in the bottom of the stripping column and boil it. This generates steam internally in the stripping column. While this eliminates a water build-up problem glycols still accumulate in the column and must be purged to the evaporation and/or recovery systems of the glycol producing unit.

Because water is introduced into the stripper and the aqueous stripper bottoms are recycled to the absorber to provide a closed system, a purge or bleed stream is required to remove the excess water which accumulates. This purge stream commonly called "the lean cycle water stream" generally contains appreciable quantities of ethylene glycol in it, e.g., 1 to 3 percent by volume and this glycol is usually of such value that it cannot be discarded. Further, since the purge stream contains ethylene glycol, it cannot be easily disposed of due to the fact that ethylene glycol has a deleterious effect on the total oxygen demand of bodies of water in which this material might be discharged. Similarly, where heated stripping vessels are used, glycol buildup in the vessels require a bleed of water-glycol from the system.

The overhead from the stripper comprising ethylene oxide is passed to an ethylene oxide reabsorber and the ethylene oxide absorbed in water. From the reabsorber, a portion of the aqueous ethylene oxide mixture is passed to a glycol reactor to make ethylene glycols and a portion is passed to a refining vessel to produce purified ethylene oxide. The ethylene glycols produced in the glycol reactor are first passed to an evaporator wherein water vapor is removed and the vapor is then condensed and recycled to the reabsorber. The glycols product is taken from the evaporator as bottoms, further dried and passed through a distillation train wherein monoethylene glycol can be recovered in a first distillation vessel as overhead. The bottoms is then passed to a second distillation vessel wherein diethylene glycol is recovered as overhead, and the bottoms passed to a third distillation vessel wherein triethylene glycol is recovered as overhead. Alternatively, the ethylene glycols can be separated in a fractionation column.

The portion of ethylene oxide which is passed from the reabsorber to produce purified ethylene oxide is first passed to a refining column wherein the ethylene oxide is recovered as overhead and the aqueous bottoms containing ultra-violet light absorbers is recycled to the reabsorber. The ethylene oxide overhead from the refining column can then be further purified in a subsequent vessel to remove carbon dioxide overhead and the ethylene oxide bottoms passed to a third distillation vessel wherein the purified ethylene oxide product is recovered as overhead.

It would be desirable if the aqueous bottoms could be recycled from the ethylene oxide refining vessel to the reabsorber to provide makeup water and obviate the need for sewering said bottoms. The use of this bottoms in the preparation of ethylene glycols, however, has caused the monoethylene glycol product to be unsuitable for use as fiber grade material. More particularly, it has been found that the aqueous bottoms in the refining column contains ultra-violet light absorbers which contaminate monoethylene glycol produced therefrom.

It would also be desirable if the purge stream could be recycled to the reabsorber, but the purge stream contains ultra-violet absorbers which contaminate monoethylene glycol produced from said ethylene oxide. It would also be desirable if the purge stream could be recycled to an ethylene glycol water evaporator to be used as reflux to produce purified ethylene glycol, but the purge stream contains both salts which cause scaling in the evaporator and ultra-violet absorbers which contaminate the monoethylene glycol product.

It has now been discovered that the purge stream from the ethylene oxide stripper can be upgraded to render it suitable for recycling to the ethylene oxide reabsorber and ethylene glycol evaporator, when the purge stream is deionized by treatment with ion exchange materials to remove metal salts, the purge stream passed to a degassifier to remove carbon dioxide and other volatiles and the purge stream treated with activated carbon to remove ultra-violet light absorbers.

It has further been discovered that the aqueous bottoms from the ethylene oxide refining vessel can be recycled to the ethylene oxide reabsorber, and a fiber grade monoethylene glycol product recovered. It is only required that the ethylene oxide passed from the reabsorber to the ethylene oxide refining vessel be controlled to provide a feed to the glycol reactor having an amount of aqueous bottoms from the ethylene oxide refining vessel insufficient to contaminate the monoethylene glycol product and render it unsuitable for use as a fiber grade product.

DETAILED DESCRIPTION OF THE INVENTION

More particularly, the invention as broadly defined comprises: In the manufacture of ethylene glycols by the steps of:

a. reacting air or oxygen and ethylene in the presence of a catalyst at elevated temperatures to produce ethylene oxide;

b. absorbing the ethylene oxide of step (a) in water;

c. stripping the ethylene oxide from the water of step (b) by contact with steam, and recovering and condensing steam to water and recycling resultant water to step (b);

d. reabsorbing in water the ethylene oxide recovered from step (c);

e. reacting a portion of the ethylene oxide and water of step (d) to produce ethylene glycols;

f. evaporating water of step (e) and condensing and recycling water to step (d);

g. distilling ethylene glycols of step (e) to separate monoethylene glycol therefrom; and h. distilling a portion of the ethylene oxide and water of step (d) to separate the ethylene oxide and recycling resultant water to step (d);

the improvement which comprises removing a portion of the water condensed in step (c), in an amount sufficient to maintain a water balance in said absorbing and stripping steps (b) and (c), treating removed water with ion exchange materials to remove salts contained therein, degassing removed water to remove carbon dioxide and volatiles therefrom, and treating removed water with activated carbon to remove ultra-violet absorbers and recycling the resultant water to steps (d) or (f) or both as required to provide makeup water or reflux medium; and the further improvement which comprises regulating the amount of ethylene oxide and water passed from step (d) to step (h) such that the amount of water recycled to step (d) is not so great as to introduce an amount of ultra-violet light absorbers sufficient to render the monoethylene glycol of step (g) unsuitable for use as fiber grade material.

In order to set forth clearly the nature of the invention, the entire ethylene oxide-glycol process is described in relation to the improved process of the invention in detail. Typically, air or oxygen and ethylene are fed to a reactor filled with a silver catalyst. The ethylene and oxygen react in the presence of the catalyst at temperature typically in the range of from 100°C. to 500°C. and preferably in the range of 200°C. to 360°C. The ethylene oxide vapor produced overhead is then passed to an absorber where it is countercurrently contacted with water at a temperature of about 85°F. At an absorber bottoms temperature of about 118°F. and the top pressure of aboout 270 p.s.i. absolute, ethylene is recovered as a gas and recycled to the ethylene oxide reactor. The absorber bottoms containing principally ethylene oxide is raised to a temperature of about 212°F. by a series of heat exchangers and passed to a stripper, preferably at a point near the top. Steam at a temperature of about 500°F. is passed into the stripper preferably at a point near the bottom and the stripper is operated at a top pressure and temperature of about 20 p.s.i. absolute and 209°F. to recover ethylene oxide overhead. The ethylene oxide is then passed through a series of heat exchangers to reduce the temperature to about 96°F. where it is fed into a reabsorber preferably at a point near the bottom. The aqueous bottoms from the stripper is passed through a series of heat exchangers to reduce the temperature to about 85°F. and then recycled to the absorber, preferably at a point near the top. A portion of the aqueous bottoms from the stripper, however, is purged or bled from the stream in order to remove inorganic salts and ultra-violet absorbers and maintain a water balance in the absorber stripper system. This purge stream is passed to an ion exchange bed, to a degasser and to a bed of activated carbon.

The deionization occurring in the ion exchange bed can be accomplished by the use of a number of commonly employed organic ion exchange resins such as the sulfonic acid cation type and the weak base anion type. In addition, inorganic exchangers such as the natural and synthetic alumino silicate cation exchanger gels can be employed. Preferred, however, are the organic high temperature types, e.g., effective at 85°F. such as the styrene divinyl benzene cation resins having a sulfonic acid functionality, and the weak base anion resins such as styrene divinyl benzene having a quarternary ammonium functionality. The most preferred resins of the aforesaid styrene divinyl benzene types are a cation exchange resin designated Amberlyst A15 and an anion exchange resin designated Amberlyst A21, both sold by Rohm & Haas Company.

The deionization can be accomplished by use of the conventional reverse and mixed mono-bed methods. The conventional method is preferred, however, in which the purge stream is first passed through a cationic exchanger in the hydrogen form in order to remove the cations and replacing them by hydrogen ions. Then the purge stream is preferably degassed by heating under reduced pressure to remove carbon dioxide and volatiles. From the degasser, the purge stream is preferably passed through an anion exchange resin in the hydroxyl form. The resultant degassed and deionized aqueous purge stream is then preferably fed through a bed of activated carbon to remove the ultra-violet absorbers, and then recycled either to the reabsorber, to the ethylene glycol evaporator, or both.

Continuing with the process, the ethylene oxide from the stripper is passed to a reabsorber where water is added, preferably at a point near the top, countercurrent to the ethylene oxide added near the bottom, at a top temperature and pressure of about 98°F. and 15 p.s.i. absolute. The reabsorber bottoms comprising ethylene oxide and water is then fed in part to an ethylene glycol reactor and in part to an ethylene oxide refining column, the amounts depending upon the product distribution desired. In the glycol reactor, the ethylene oxide and water is reacted at a temperature between about 240° and 310°F. or an average temperature of about 275°F., and pressure of about 135 p.s.i. absolute. The resultant mixture comprising ethylene glycols in water is then passed to a multi-effect evaporator and the steam recovered overhead to be condensed and recycled to the reabsorber preferably at a point near the top. The ethylene glycol bottoms from the multi-effect evaporator is then preferably passed to a drying column wherein at a temperature of about 150°F. and pressure of 200 millimeters of mercury, the remaining water is removed. The ethylene glycols bottoms from the drying column is then fed into a fractionation column or distillation train in which at a temperature of about 196°F. and pressure of 10 millimeters mercury at the top of the column, monoethylene glycol product is recovered. If a fractionation column is not employed, the bottoms comprising diethylene glycol and triethylene glycol is then fed to a second column wherein the diethylene glycol is recovered as overhead, and the bottoms is fed to a third column wherein triethylene glycol is recovered as overhead.

The portion of ethylene glycol in water which was not passed from the reabsorber to the glycol reactor, is passed to an ethylene oxide refining column wherein at a top pressure of about 446 p.s.i., absolute and temperature of about 110°F., the ethylene oxide is recovered as overhead. The ethylene oxide is then passed to a series of heat exchangers to condense the vapors to liquid and subsequently passed to a second column, preferably at a point near the bottom, wherein carbon dioxide is recovered overhead at a top temperature and pressure of about 122°F. and 58 p.s.i. absolute. The bottoms from the second column is then fed to a third column and the purified ethylene oxide product recovered overhead at a top temperature and pressure of about 110°F. and 46 p.s.i. absolute. The bottoms from the ethylene oxide refining column comprising water and ultra-violet absorbers is recycled to the reabsorber preferably at a point near the top to absorb ethylene oxide entering countercurrently.

It has been found that in addition to the deionization, degassing, and activated carbon treatment of the ethylene oxide stripper purge stream, it is necessary that the amount of ethylene oxide and water bottoms from the reabsorber, which is passed to the ethylene oxide refining column, be limited to an amount such that the aqueous bottoms, recycled from the refining column to the reabsorber, is not so great as to be carried over into the glycol reactor and subsequently into the monoethylene glycol product. The amount of ethylene oxide and water bottoms passed from the reabsorber to the ethylene oxide refining column, without sacrificing the quality of the monoethylene glycol product, will depend in part upon the efficiency of the system, including the ion exchange system and the activated carbon bed. It has been found, however, that the present standard of fiber grade monoethylene glycol can be produced, when the amount of ethylene oxide in water passed from the reabsorber to the ethylene oxide refining column is controlled, such that the aqueous bottoms which are recycled to the reabsorber are sufficiently low, such that the volume ratio of this aqueous bottoms stream to the ethylene oxide feed stream to the glycol reactor is no more than about 6 and preferably no more than about 5.3.

According to the aforedescribed process, it is not necessary to sewer large amounts of water-containing products and the monoethylene glycol produced has a minimum transmittance of 70 percent at a wave-length of 220 nanometers, a minimum of 88 percent transmittance at a wave-length of 250 nanometers, a minimum of 95 percent transmittance at a wave-length of 275 nanometers, and 100 transmittance at a wave-length of 350 nanometers, using distilled water as a reference liquid in a Beckman Model DU 2400 Spectrophotometer. These percent transmittance are the present specifications for fiber grade monoethylene glycol. The following example illustrates a preferred embodiment of the process of the invention.

EXAMPLE

A purge stream, from an ethylene oxide plant stripper, containing ethylene oxide, water, inorganic salts and ultra-violet absorbers, which averaged 30–35 gallons per minute in volume flow, was passed into the top of a cationic exchange resin bed having a volume of 65 cubic feet and in which the cationic exchange resin was a styrene divinyl benzene resin having a sulfonic acid functionality. (Amberlyst A15, Rohm & Haas) The purge stream was then withdrawn from the cation exchange resin bed and passed to a degasser approximately 20 feet tall having a diameter of 20–42 inches packed with interlocking ceramic. The degasser was operated at a temperature of about 85°F. at 200 mm Hg pressure. When the carbon dioxide and other volatiles were removed, the bottoms were fed into an anion exchange resin bed having a volume of 29 cubic feet wherein the anion exchange resin was a styrene divinyl benzene resin having a quarternary ammonium functionality. (Amberlyst A21, Rohm & Haas) The resultant stream was then passed from the anion resin bed into the top of a carbon bed contained in a 6 foot diameter pressure vessel wherein the bed was packed to a depth of 4 feet with a Pittsburgh activated carbon, type Cal, 12 to 40 mesh, manufactured by Calgon Corporation. The vessel was 8 feet in height and the carbon bed was placed on a screen about 1 foot from the bottom of the vessel. The vessel was maintained at an internal pressure of 125 p.s.i.g. The water recovered after passage through the carbon bed was recycled in part to the ethylene oxide reabsorber and to serve as reflux in the ethylene glycol evaporator.

Ethylene oxide and water bottoms from a plant ethylene oxide reabsorber were passed in part to a glycol reactor and in part to an ethylene oxide refining column, under the conditions previously described. The amount of ethylene oxide and water bottoms charged to the refining column was controlled such that the volume ratio of recycled aqueous bottoms going to the reabsorber to the ethylene oxide water mixture going into the glycol reactor, was about 5.3. A triple effect evaporator was employed to remove water from the glycols and deionized carbon treated degassed water from the ethylene oxide strippers was used as reflux medium. From the evaporator, the ethylene glycols bottoms was passed to a drying column operated at 150°F. and 200 millimeters of mercury pressure, whereupon the remaining water was removed overhead. The ethylene glycols bottoms was then passed to the first column in a distillation train wherein the column was operated at a top temperature and pressure of 196°F. and 10 millimeters of mercury, and the overhead monoethylene glycol product met fiber grade specifications hereinbefore defined.

The activated carbon employed is preferably made from bituminous coal but bone charcoal and wood charcoal types can be employed.

The process equipment employed was commercially available equipment and suitable equipment is readily available, preferably however, non-corrosive equipment is employed such as that made of stainless steel.

While the invention has been described with reference to certain specific embodiments, it is not intended to be limited thereby except insofar as appears in the accompanying claims.

I claim:
1. In the combined manufacture of ethylene oxide and ethylene glycols which includes the steps of:
   a. reacting oxygen and ethylene in a reactor in the presence of a catalyst at elevated temperatures to produce ethylene oxide;
   b. absorbing ethylene oxide produced in step (a) in water in an absorber to produce an ethylene oxide-water stream;
   c. stream stripping ethylene oxide from the ethylene oxide-water stream produced in step (b) in a stripping column to produce an ethylene oxide over- head stream and an aqueous bottoms stream and recycling aqueous bottoms from the stripping column to the absorber of step (b);

d. reabsorbing stripped ethylene oxide from step (c) in water in a reabsorbing column to provide an ethylene oxide-water stream;

e. forwarding to a glycol reactor a portion of the ethylene oxide-water stream produced in step (d) and reacting ethylene oxide contained therein with water to produce a product stream comprising ethylene glycols in water;

f. evaporating water from the product stream produced in step (e) in an evaporator to produce a glycols product stream, and recycling evaporated water to the reabsorbing column of step (d);

g. distilling the glycols product stream produced in step (f) to produce a monoethylene glycol product; and h. distilling a portion of the ethylene oxide-water stream produced in step (d) in an ethylene oxide refining column to provide an overhead ethylene oxide product stream an an aqueous bottoms stream, and recycling aqueous bottoms from the refining column to the reabsorbing column of step (d);

the improvement which comprises (1) removng as a purge stream a portion of the recycled aqueous bottoms from the stripping column of step (c), said portion being sufficient to maintain the water balance in the absorbing column-stripping column system of steps (b) and (c), (2) treating purge stream water with cation exchange materials to remove inorganic salts therefrom, degassing the purge stream water, and contacting ion exchange-treated purge stream water with activated carbon to remove ultraviolet light absorbers therefrom, (3) forwarding thus treated purge stream water to the reabsorber of step (d) or the evaporator of step (f) or both, and (4) maintaining the volumetric ratio of (i) aqueous bottoms from the refining column of step (h) recycled to the reabsorbing column of step (d) to (ii) the ethylene oxide-water stream forwarded to the glycol reactor at a value not greater than 6, thereby producing ethylene oxide and fiber grade monoethylene glycol.

2. The process of claim 1 wherein the ratio of (i)/(ii) is not greater than 5.3.

3. The process of claim 1 wherein degassed purge stream water is treated with anion exchange material in the hydroxyl form before contact with activated carbon.

* * * * *